March 18, 1952  S. H. WOODRUFF  2,589,589
DISTRIBUTING NOZZLE
Filed June 10, 1947
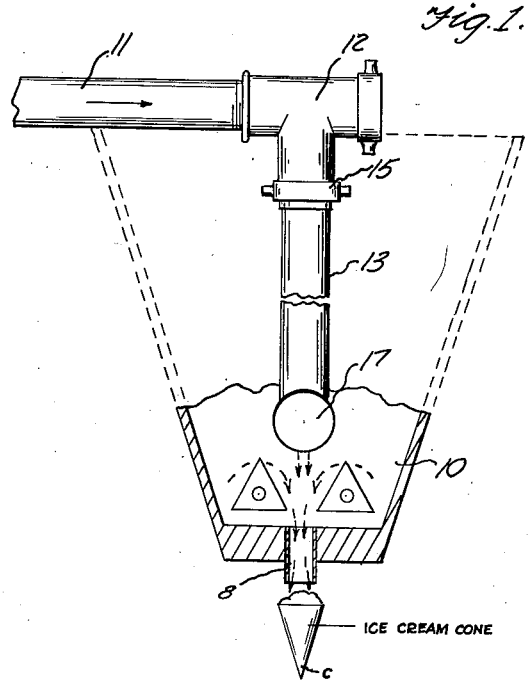
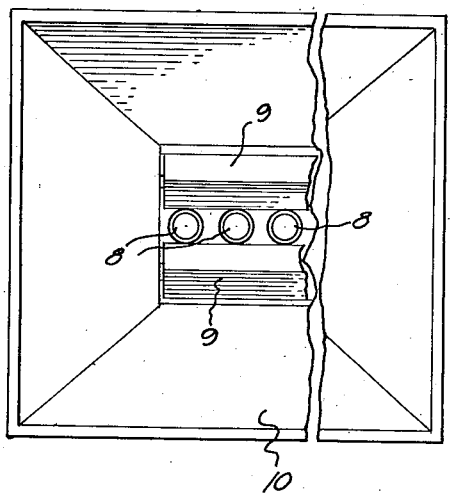
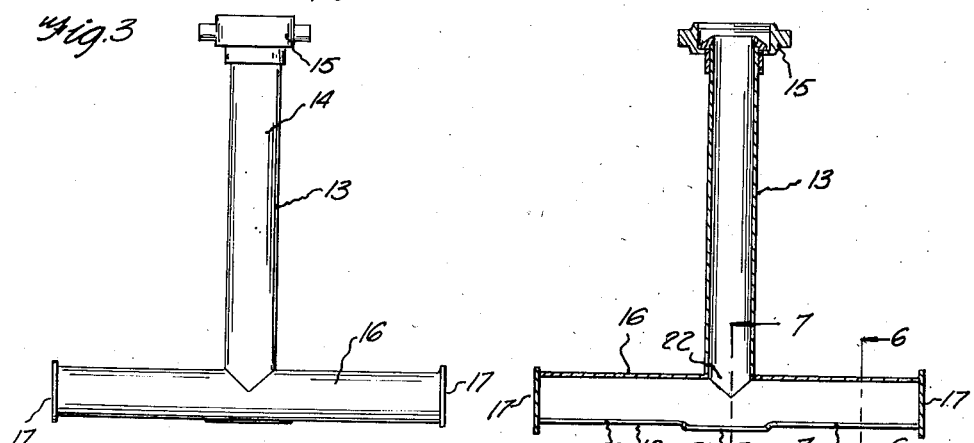
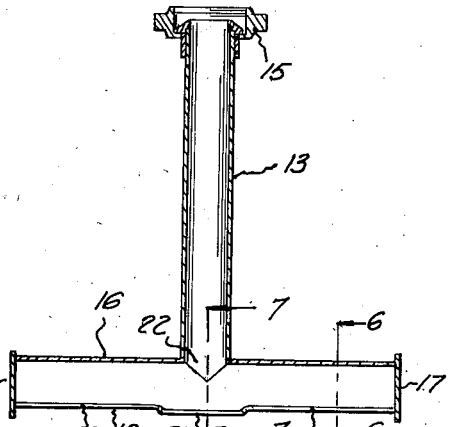
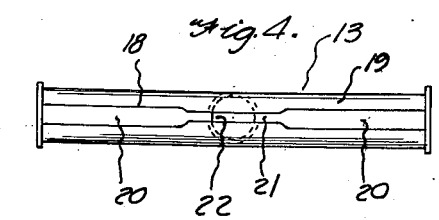
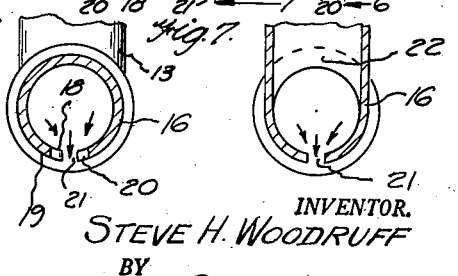
INVENTOR.
STEVE H. WOODRUFF
BY
HIS ATTY.

Patented Mar. 18, 1952

2,589,589

UNITED STATES PATENT OFFICE 2,589,589

DISTRIBUTING NOZZLE

Steve H. Woodruff, Oklahoma City, Okla.

Application June 10, 1947, Serial No. 753,693

1 Claim. (Cl. 226—93)

This invention relates to distributing nozzles and has for one of its objects the production of a simple and efficient means for properly and evenly distributing material such as ice cream and the like, over the length of a mold or cone-filling device, in a manner to prevent an uneven or excessive amount of ice cream and the like from being discharged into the mold from a cone-filling device at one point adjacent the entrance opening of the nozzle.

A further object of this invention is the production of a simple and efficient elongated distributing nozzle having an elongated discharge slot which is restricted in size adjacent the point where material enters the nozzle prior to discharge therefrom to cause the material to spread laterally of the entrance opening and to be discharged evenly through the discharge slot throughout the length of the elongated distributing nozzle.

Other objects and advantages of the present invention will appear throughout the following specification and claim.

In the drawing:

Figure 1 is a side elevational view of the nozzle showing the supply pipe secured thereto, the hopper being partly shown in dotted lines and partly in section;

Figure 2 is a top plan view of the hopper, partly broken away, and the supply pipe being removed;

Figure 3 is a front elevational view of the nozzle;

Figure 4 is a bottom plan view of the nozzle;

Figure 5 is a vertical sectional view of the nozzle;

Figure 6 is an enlarged transverse sectional view taken on line 6—6 of Figure 5;

Figure 7 is an enlarged sectional view taken on line 7—7 of Figure 5.

By referring to the drawing, it will be seen that the conventional hopper 10 is shown in dotted lines and suitable molds, preferably six in number, are carried in the bottom of the hopper 10 in a conventional manner. The hopper 10, shown in Figures 1 and 2, and the freezing unit which may be used are not part of my invention, but the invention resides in the nozzle which is described in detail as follows:

A supply line pipe 11 conveys the ice cream or other material from a suitable freezer or source of supply to the elbow 12 from which the inverted T-shaped nozzle 13 is suspended. The nozzle 13 comprises a substantially vertical hollow pipe 14 which carries a threaded swivel nut 15 at its upper end for connecting the nozzle 13 to the elbow in a suspended position.

An elongated distributor head 16 in the nature of a substantially horizontally extending hollow pipe is carried by the lower end of the pipe 14 and communicates therewith, as shown in Figure 5. This distributor head 16 is closed at its ends as indicated at 17. The substantially horizontally extending hollow pipe which constitutes the distributor head 16 is provided with a longitudinally extending discharge or distributor slot 18 in the bottom face 19 thereof, as shown in Figure 4. The slot 18 is provided with widened end portions 20 and a restricted or narrowed intermediate portion 21, which is located just below the communicating opening 22, which opening 22 forms a communication between the pipe 14 and the head 16—see Figures 4 and 5.

The operation of the nozzle is as follows:

Ice cream or other product passes through the pipe 11 from the freezer and down through the pipe 14 and into the horizontal head 16. Since the slot 18 is restricted as to its width, as at 21, just below the opening 22, the ice cream or other product will spread laterally of the restricted portion 21 to the widened portions 20. The ice cream or other material will therefore be discharged evenly or in uniform volume throughout the length of the slot 18 and spread over the dispensing tubes 8 which are located in the bottom of the hopper 10 in the conventional or desired manner. The rotors 9, which are triangular in cross section rotate toward each other and feed the ice cream through the tubes 8 and into the cones, such as the cone C shown in Figure 1 and located below the hopper 10. The rotors 9 may be driven in any desired manner.

The design of the slot 18 by providing the wide lateral portions 20 and the intermediate restricted or narrow portion 21 will cause the material discharged from the nozzle 13 to spread evenly into the molds in the bottom of the hopper as the material comes out of the bottom slot 18 of the nozzle 13. This will prevent the bulk of the material from passing through that portion of the discharge slot 18 at the point where the restricted portion 21 is located and deliver a heavy deposit below the opening 22 and a thin layer or light deposit near the ends of the slot 18 of the head 16. The restricted opening 21 will act as a check to retard the discharge of material at the center of the slot 18 in proportion to the distance and area of the head beyond the central restricted portion 21, thereby causing the material to be discharged evenly throughout the length of the slot 18.

The present nozzle is particularly adapted for, and was perfected for use in producing novelties known as frozen drumsticks and similar sticks, and filling cones, as shown, wherein it is desired to produce a product of uniform size and shape within a mold or molds. It is important and desirable to evenly distribute the material into and over the mold or molds in an even manner so as to prevent the piling up of the material at one point in the mold. Consequently, the material must be checked at the point where the material enters the head 16 to cause the lateral spreading of the material laterally of the communicating opening 22. The restriction of the width of the slot 18 at the point 21 accomplishes this result in an efficient and effective manner.

It should be understood that while the present invention relates particularly to a means for spreading ice cream evenly over a mold or molds, it is not desired to limit the use of the nozzle to this particular use, since it also may be effectively used in evenly distributing other semi-liquid or similar products where a uniform distribution is desired laterally of a point of entrance to points of discharge to one side or both sides of said point of entrance.

Having described the invention, what I claim as new is:

In a device for filling from a hopper a row of comparatively small individual containers with a commodity in plastic state, the combination of: a row of spaced outlet tubes in the bottom of said hopper, each tube adapted to direct said commodity into one of said containers therebelow; feeders above said row of tubes in parallel relation thereto, said feeders lying in spaced relation to each other, and being rotatable toward each other to simultaneously convey said commodity to the upper ends of all of said tubes; a horizontal feeder pipe stationarily mounted in said hopper above said feeders in parallel relation thereto; a longitudinally extending elongated outlet opening in the lower wall of said pipe directly above the space between said rotatable feeders, said opening being restricted laterally along its central portion and being wider at each end of the restricted portion to cause the commodity to spread out longitudinally in the pipe, so that the commodity is neatly and evenly extruded through the opening along the entire length thereof, and neatly and evenly introduced into said respective individual containers without protrusion therefrom.

STEVE H. WOODRUFF.

REFERENCES CITED

The following references are of record in the file of this patent:

UNITED STATES PATENTS

| Number | Name | Date |
|---|---|---|
| 771,560 | Meurell | Oct. 4, 1904 |
| 1,328,025 | Wheeler | Jan. 13, 1920 |
| 1,852,005 | Garbutt | Apr. 5, 1932 |
| 1,955,009 | McMillan | Apr. 17, 1934 |
| 2,194,948 | Lenzke | Mar. 26, 1940 |